Feb. 17, 1953     J. G. BAKER     2,628,532
FIVE COMPONENT OBJECTIVE LENS FOR AERIAL PHOTOGRAPHY
Filed Nov. 28, 1950

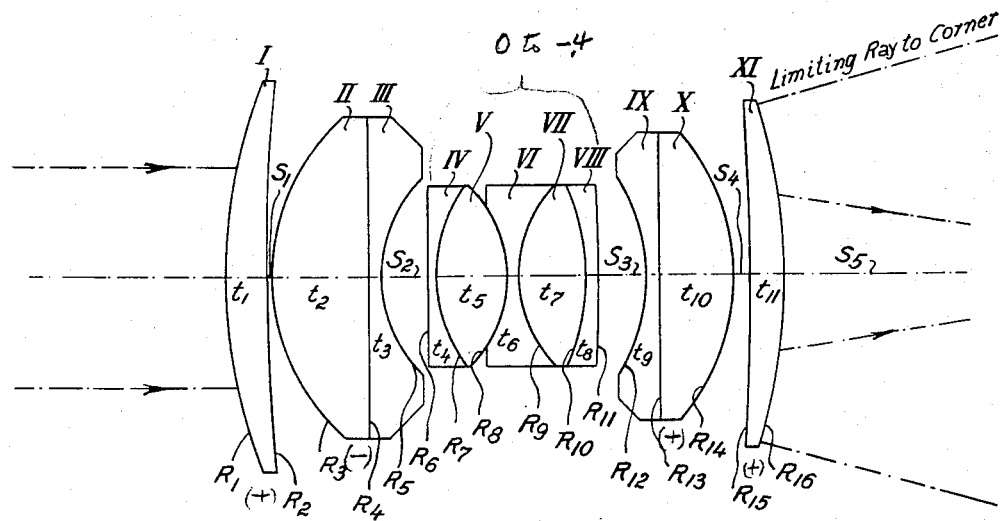

Objective: EF 1.000    f/3.5

| LENS | $N_D$ | V | GLASS TYPES | RADII | THICKNESSES |
|---|---|---|---|---|---|
| I | 1.72 | 29.3 | EDF-3 | $R_1 = 0.7105$<br>$R_2 = 2.979$ | $t_1 = 0.0521$<br>$S_1 = 0.0026$ |
| II<br>III | 1.517<br>1.527 | 64.5<br>51.1 | BSC-2<br>KzF-6 | $R_3 = 0.2751$<br>$R_4 = $ plano<br>$R_5 = 0.1805$ | $t_2 = 0.1284$<br>$t_3 = 0.0174$<br>$S_2 = 0.0608$ |
| IV<br>V<br>VI<br>VII<br>VIII | 1.617<br>1.540<br>1.527<br>1.540<br>1.617 | 36.6<br>59.6<br>51.1<br>59.6<br>36.6 | DF-2<br>BaK-2<br>KzF-6<br>BaK-2<br>DF-2 | $R_6 = $ plano<br>$R_7 = 0.1975$<br>$R_8 = -0.1695$<br>$R_9 = 0.1609$<br>$R_{10} = -0.2568$<br>$R_{11} = -2.4296$ | $t_4 = 0.0130$<br>$t_5 = 0.0912$<br>$t_6 = 0.0174$<br>$t_7 = 0.0912$<br>$t_8 = 0.0130$<br>$S_3 = 0.0615$ |
| IX<br>X | 1.527<br>1.540 | 51.1<br>59.6 | KzF-6<br>BaK-2 | $R_{12} = -0.2483$<br>$R_{13} = $ plano<br>$R_{14} = -0.2737$ | $t_9 = 0.0174$<br>$t_{10} = 0.1034$<br>$S_4 = 0.0174$ |
| XI | 1.72 | 29.3 | EDF-3 | $R_{15} = -6.293$<br>$R_{16} = -0.7060$ | $t_{11} = 0.0478$<br>$S_5 = 0.6903$ |

INVENTOR
James G. Baker
BY
Pennie Edmonds Morton & Burrows
ATTORNEYS

Patented Feb. 17, 1953

2,628,532

UNITED STATES PATENT OFFICE 2,628,532

FIVE COMPONENT OBJECTIVE LENS FOR AERIAL PHOTOGRAPHY

James G. Baker, Winchester, Mass., assignor to The Perkin-Elmer Corporation, Glenbrook, Conn., a corporation of New York Application November 28, 1950, Serial No. 198,010

8 Claims. (Cl. 88—57)

This invention relates to optical objectives for photographic purposes, which are corrected for spherical and chromatic aberrations, coma, astigmatism, field curvature, and distortion. More particularly, the invention is concerned with a novel photographic objective, which is particularly adapted for night aerial photography and is characterized not only by improved correction for all the lower order aberrations, whose control is essential to the performance of modern precision objectives, but also by an improved correction for those two aberrations ordinarily regarded as least amenable to control, namely, secondary spectrum and oblique spherical aberration. As is well known, the aberration designated secondary spectrum sets a fairly definite limit on contrast and resolution even on the optical axis, when an appreciable spectral interval is to be covered, and oblique spherical aberration places a limit on contrast and resolution at points far off-axis. By reason of its improved correction for secondary spectrum and oblique spherical aberration, the new objective has a performance not heretofore attained in photographic objectives.

In many standard types of optical objectives, the two limiting aberrations of secondary spectrum and oblique spherical aberration are kept within tolerable limits simply because of the short focal lengths encountered in ordinary photographic applications. In aerial photography without filter, as often practiced at night, and in certain scientific applications, the spectral range to be covered is so great as to encounter definite limitations on resolution and contrast. The defects of these objectives become more serious, when the focal length is increased, and are still further magnified, when lens speed is increased. For aerial photography, the resolution and contrast in the focal plane should be approximately constant or even better than in ordinary hand cameras, even though the focal length be increased by a factor of ten or more. Thus, the aberrations of an f/3.5 aerial lens having a focal length of 24" must be corrected to a degree at least twelve times superior to the correction for an f/3.5 miniature camera lens of 2" focal length, where the angular field, resolution, and contrast are about equivalent.

Lenses used for night aerial photography over wide fields must meet the most stringent requirements. Since maximum exposure must be obtained, it is common practice to omit a filter, despite the haze produced by the flash, and this practice requires that the lens yield sharp images over a spectral range from blue to red. Standard lenses, which give adequate results in focal lengths of 7" to 12", have been found deficient for night aerial photography, when scaled up to 24" focal length, and standard lenses of a focal length of 24", which give adequate resolution when narrow color filters are employed, fail when the spectral range is increased and, in any case, have speeds of the order of f/6, whereas a speed of f/3.5 is required.

Modern military night photography requires, for best results, a well-corrected f/3.5 lens of a focal length of 24" covering a 9" x 18" photographic field with adequate resolution obtained over a spectral range from blue to deep red. A straight 20 lines/mm. resolution at every point in the field is considered a minimum requirement and the attainment of this resolution is to be accomplished by good contrast rendition of microscopic detail for test exposures held constant in target total exposure (time × intensity). A lens answering such requirements evidently represents a distinct jump in overall quality over standard lenses, rather than a percentage improvement, and, so far as I am aware, there has been no disclosure heretofore of a 24" f/3.5 refractive lens system of 45 degrees total field, corrected in any appreciable way for secondary spectrum or for oblique spherical aberration.

One further requirement of importance in night aerial photography involves vignetting. Many lenses rated as "fast" have such vignetting off-axis that there is a distinct loss of lens speed at the sides and corners of the format. In many instances, such vignetting is purposely introduced to cut off rays of insufficient correction to contribute to a sharp image and it is thus not at all uncommon for a standard lens to yield illumination in an image at the edge of the field, which is only 25% of that obtained on axis. Part of this loss of intensity is the inevitable consequence of the fourth-power cosine law, as a result of which the illumination on a flat focal plane 20 degrees off-axis is inherently only 78% of that on axis. The remainder of the loss of intensity is caused by vignetting within the lens system itself, whether purposely introduced by inadequate front and rear clear apertures in order to eliminate poorly corrected rays or resulting from the lens curves and the consequent restricted apertures. It is evident that a lens, which is rated at f/3.5 on axis but which is actually f/7 at the edge of the field, is not as well suited to night aerial photography as a lens of f/4.5 to f/5 over the field. Desirably, the speed rating should be f/3.5 on axis and not less than f/4.5 at the edge of the field.

The present invention is directed to an optical objective for photographic purposes and particularly night photography, which meets all the requirements above set forth. The new objective yields sharp images over a wide spectral range, has the desired resolution and contrast throughout the field, and has so little vignetting that the illumination is uniform within the specified limits.

The new objective is related to the six-element

Biotar form of lens, which comprises negative menisci lying between positive components in more or less symmetrical arrangement around a central stop, but differs therefrom in important respects. The six-element Biotar type of lens has many desirable characteristics but, for the stringent purposes outlined above, it is limited by secondary spectrum, which is of normal value, and by oblique spherical aberration, which can be reduced but not wholly eliminated. In the new objective, the standard advantages of the original six-element lens form are retained and the correction for secondary spectrum and oblique spherical aberration are achieved by the addition of a central corrective group lying between the negative components. While the use of the corrective group is of major importance in the production of an objective having the desired performance, the addition of such a group would not alone serve the desired purpose. The new objective may, accordingly, be thought to involve three distinct features, which contribute to the high quality final correction.

The first of the contributing features mentioned above is the use of glass of high index and high dispersion for the first and last components of the system. These two components need not be of the same glass nor compounded of the same glasses.

It is well known that the use of high index glasses for the positive elements in an optical objective often aid in bringing about a high state of correction for a given lens speed, or increased speed for the same quality of performance. While materials of high index and high dispersive power have long been known, these materials have hardly ever been used as positive elements in objectives because of the excessive color introduced by their use. Instead, every effort has been made to develop materials of high index and high $v$-value, such as the rare earth glasses. Such glasses, however, are not generally available and are expensive in diameters of 10" or greater.

The objective of the present invention makes use of high index, highly dispersive glasses for the positive components, in spite of the apparent serious disadvantages to color correction resulting therefrom. I have ascertained that, after the primary color arising from the use of such glasses for positive components has been eliminated by means of hyperchromatic combinations of lighter glasses, the secondary spectrum that normally remains is very much reduced. The reason for this is that the partial dispersions of the dispersive flint glasses, when plotted against the respective $v$-values, exhibit a curvature, and this curvature makes it possible to employ hyperchromatic combinations of glasses of smaller index and high $v$-values to balance out the secondary spectrum of more dispersive and high index glasses. Accordingly, the dispersive material, which is employed in conventional objectives in negative components and produces secondary spectrum, is used in the new objective for positive components and is compensated by lighter glasses, with the result that the secondary spectrum is reduced.

In systems of a restricted character, it is possible to eliminate secondary spectrum to a point where only a small tertiary spectrum remains but, in a complex photographic system, such as the present objective, it is necessary to arrive at the most favorable compromise among the many aberrations. In the new objective, the secondary spectrum has been reduced to about 30% of normal and any further reduction has been found disadvantageous, because it introduces excessive curvatures precluding satisfactory monochromatic performance at f/3.5 and a 24" focal length.

A by-product of the use of the high index, highly dispersive glasses for the outermost components in the objective of the present invention is the controlled elimination of chromatic spherical aberration. In truly apochromatic systems, it is considered desirable to correct for a common focus for three widely separated colors and for spherical aberration and coma in two colors. In practice, for all refractive systems, completely null aberrations in the mathematical sense cannot exist and the correction is for selected rays of the aperture and for selected colors. Thereafter, the performance of the system depends on the residuals from other colors and other rays. In the objective of the invention, a practical state of full apochromatic correction is approached, in that chromatic spherical aberration is eliminated for two wave-lengths for the rim rays of the adopted aperture on axis. While coma is eliminated for one color only, the symmetry of the design prevents the occurrence of any marked residuals in outlying colors. The new objective of 24" focal length is thus as well corrected for color at the focal plane as a conventional system of a focal length of 7", which is known to give adequate night photographs.

The elimination of chromatic spherical aberration in the objective is aided by the use of high index, highly dispersive components as follows. Blue rays are refacted to lower relative heights at the intermediate negative surfaces, which are then much weakened in their normal over-correcting action. By control of the lens powers of the dispersive components and by adopting the proper mean relative height among the various surfaces, it has proved possible to eliminate chromatic spherical aberration to the extent mentioned above, that is, with rim ray agreement obtained for two widely separated colors. A zonal variation of chromatic spherical aberration of higher order remains but is of no consequence.

The second feature contributing to the performance of the new objective with respect to reduction of secondary spectrum arises from the employment of hyperchromatic combinations of glasses known to yield small secondary spectrum. In the new objective, the high index, highly dispersive components do not represent all of the converging power of the system and hence all of the positive color action, and the convex surfaces of the negative menisci contribute greatly in these respects. If a hyperchromatic combination of ordinary flint and crown glasses were used to correct the system for primary color, the beneficial action for reduced secondary spectrum obtained from the use of the high index, highly dispersive flint glasses for the positive components would be partially wasted, because the color correction in the normal way of the convex surfaces of the negative menisci would reintroduce copious secondary spectrum tendencies. Accordingly, in the new system, the correction of secondary spectrum is divided into two parts. In the first, the color of the high index, highly dispersive flint glasses used for the positive components is eliminated by hyperchromatic combinations of DF-2 and BaK-2 glasses. In the second, the positive color of the convex surfaces of the dispersive menisci is compensated by the use of the glass identified as K$z$F-6 in the Schott catalog. If this latter pairing of BaK-2 and KzF-6 were a perfect match, the secondary spectrum of the system would be practically eliminated but, while glass pairs more nearly matched in respect to secondary spectrum exist, their use leads to excessive curvatures before color correction can be achieved.

The third novel feature of the new objective has to do with the control of oblique spherical aberration. Lenses of the general Biotar type are well known to be afflicted by pronounced oblique spherical aberration, which is enhanced by the superior corrections afforded for other aberrations. A number of ways have been developed for reducing oblique spherical aberration in these lens forms but it has not been found possible heretofore to eliminate the aberration altogether. The improvements obtained have taken the form of a reduction in the magnitude of the aberration rather than of the successful introduction of an opposing refraction, which brings about an actual zero for certain rays.

In the new objective, the oblique spherical aberration has been reduced in magnitude by employing the expedients known to be suitable for the purpose and the residual has then been eliminated altogether for selected marginal rays by the introduction of opposed refractions. Thus, at 20 degrees off-axis, the marginal rays for the 0.9 zone of the clear aperture of the entrance pupil are in common focus with the tangential focus for the central pencil at this same off-axis distance. The resulting residual at other zones resembles so-called zonal aberration on axis but is of reverse sign. The amplitude of this zonal aberration is of the order of several Rayleigh limits, which is satisfactory for a lens of such speed, focal length, and field angle as the new objective, especially when compared to the uncorrected oblique spherical aberration of a conventional lens. The new lens may, therefore, be said to be corrected in a true sense for oblique spherical aberration, which in turn makes it possible to achieve unusual illumination at great distances off-axis, as for example, 70% at 20 degrees off-axis, while preserving high image quality.

The new objective involves other features as follows. The marked barrel length permits a general reduction in refractive errors, even before compensating refractions are introduced. Surface by surface, the errors are never very large and compensation brings these errors to zero for certain selected rays of field and aperture with the residuals for other rays of no importance. The symmetry of the objective and the controlled correction for oblique spherical aberration for upper and lower marginal rays result in the elimination of all forms of coma over the aperture and field. For the same reasons, lateral color is held to small limits, measured in microns from blue to red. Thus, for 20° off-axis, the principal ray in blue light (F) has an intercept in the focal plane at a distance of −0.022 mm. from the zero distortion point and the corresponding intercepts in green light (e) and in red light (C) are, respectively, −0.020 mm. and −0.012 mm. The lateral color spread at 20 degrees off-axis is thus only −0.010 mm. and the mean distortion is only about −0.017 mm. and of the barrel type.

It is not to be expected that, in the new objective, the oblique spherical aberration will remain corrected over the entire range from violet to deep red. The compensating refractions vary in strength over the spectral range because the selected surfaces used to produce the compensation connect materials of different $v$-values. However, in the preferred form of the objective, these $v$-values differ by only 8.5 and the ensuing variation is not marked. Oblique spherical aberration is normally of the fifth order, which, when compounded with color variation, recedes into the seventh order.

The performance of fast lens systems is often limited by field curvature and higher order astigmatism but, in the new objective, the residual zones in field curvature and astigmatism are effectively less than 1 mm. in amplitude, whereas scaled-up conventional lenses may have such zones of amplitudes as great as 7 mm. The factors employed in bringing about the desired state of correction are the symmetry around the stop and the negative astigmatism introduced in the central group and at the next to last surface of the system.

A final feature of the new objective is that it is free of so-called zonal aberration on axis and definite control of fifth order spherical aberration has been provided. The rim ray at f/3.5 is thus in agreement with the paraxial focus and, in addition, the zonal aberration at the 0.7 zone is well within the Rayleigh limit at f/3.5. The axial image is, therefore, uncommonly sharp for so large and fast a lens.

For a better understanding of the invention reference may be made to the accompanying drawing, in which the single figure shows an objective according to the invention for use in aerial photography.

The specifications of the objective shown in the drawing are as follows.

[Objective: EF 1.000   f/3.5]

| Lens | $N_D$ | V | Glass Types | Radii | Thicknesses |
|---|---|---|---|---|---|
| I | 1.72 | 29.3 | EDF-3 | $R_1 = 0.7105$ | $t_1=0.0521$ |
|   |      |      |       | $R_2 = 2.979$  | $S_1=0.0026$ |
| II | 1.517 | 64.5 | BSC-2 | $R_3 = 0.2751$ | $t_2=0.1284$ |
| III | 1.527 | 51.1 | KzF-6 | $R_4 = $ plano | $t_3=0.0174$ |
|   |      |      |       | $R_5 = 0.1805$ | $S_2=0.0608$ |
| IV | 1.617 | 36.6 | DF-2 | $R_6 = $ plano | $t_4=0.0130$ |
| V | 1.540 | 59.6 | PaK-2 | $R_7 = 0.1975$ | $t_5=0.0912$ |
| VI | 1.527 | 51.1 | KzF-6 | $R_8 = -0.1695$ | $t_6=0.0174$ |
| VII | 1.540 | 59.6 | BaK-2 | $R_9 = 0.1609$ | $t_7=0.0912$ |
| VIII | 1.617 | 36.6 | DF-2 | $R_{10}=-0.2568$ | $t_8=0.0130$ |
|   |      |      |       | $R_{11}=-2.4296$ | $S_3=0.0615$ |
| IX | 1.527 | 51.1 | KzF-6 | $R_{12}=-0.2483$ | $t_9=0.0174$ |
| X | 1.540 | 59.6 | BaK-2 | $R_{13}=$ plano | $t_{10}=0.1034$ |
|   |      |      |       | $R_{14}=-0.2737$ | $S_4=0.0174$ |
| XI | 1.72 | 29.3 | EDF-3 | $R_{15}=-6.293$ | $t_{11}=0.0478$ |
|   |      |      |       | $R_{16}=-0.7060$ | $S_5=0.6903$ |

In the table, the lens elements are numbered from front to rear, $N_D$ is the refractive index for the D line of the spectrum, and V is the reciprocal dispersion. The radii of curvature for the surfaces designated $R_1$ to $R_{16}$ are marked $+$ or $-$ according to whether the surfaces are convex or concave toward the on-coming light. The axial thicknesses of the elements and the length of the air spaces between them are designated $t$ and $S$, respectively, and are numbered from front to rear.

As will be apparent from the drawing and the table of specifications, the objective in the form illustrated comprises outer collective elements I, XI made of high index, highly dispersive glasses. Between these collective elements lie two negative components in the form of compound menisci II, III and IX, X, the menisci lying with their concave surfaces opposed. Between the menisci is a central group comprising five elements IV, V, VI, VII, VIII. The menisci are made of slightly hyperchromatic combinations of glasses and the central group may properly be called an apochromatizer, although its functions include the correction of oblique spherical aberration. The net power of the group is weakly negative and its prime function is to provide correction rather than converging or diverging action. The group includes outer elements of DF-2 glass and the second and fourth elements are of BaK-2 glass, these hyperchromatic combinations eliminating the color of the highly dispersive flint glass EDF-3 used in the outer collective components I, XI. The central element of the group is made of the K$_2$F-6 glass of the Schott catalog and this pairing of BaK-2 and K$_2$F-6 glasses compensates for the positive color introduced by the convex outer surfaces of the meniscus components II, III, and IX, X.

In the normal Biotar lens of six elements, positive astigmatism arising from the second surface is compensated through the third order to a great extent by negative astigmatism at the ninth surface. The great separation between these two surfaces produces an inequality in the state of correction for higher order astigmatism and, for large lenses, this inequality, if not otherwise controlled, can reach many millimeters of focal error along the principal ray far off-axis. In the objective of the present invention, the negative astigmatism produced at the first surface ($R_6$) of the central correcting group has an advantageous effect on reduction of higher order astigmatism and third order astigmatism is practically annulled for rays in their passage through the central group, with the net result that the higher order astigmatism is reduced in magnitude. Moreover, the zonal aberration left in the correction of the oblique spherical aberration is in the over-corrected sense and this tends to compensate for the remaining astigmatism.

In setting limits to define the nature of the objective of the invention, it is to be assumed that favorable powers and curvatures of many of the surfaces are always adjusted until best results are obtained through a high state of correction, as is the usual practice. The novel quantities, which bring about an unusual correction in the new objective as compared to prior practice, may then be isolated as follows.

As pointed out above, the use of highly dispersive, high index glasses for the first and last components of the system is a vital feature. The glasses, to which I refer, are those having an index of refraction ranging from 1.80 to 1.65 and a dispersion such that their $v$-value ranges from 27 to 34. Such glasses are ordinarily known as dense or extra dense flint glasses and have long been available. In the new objective, it is not important that the first and last components be simple elements and compounding may bring about improved monochromatic correction in addition to the improved color correction. Each component, however, includes a flint element, which is a strong positive lens. In defining limits, the power of the flint element of the front and rear components need only be considered, regardless of whether this element is combined with one or more others.

If the flint element in each of the first and last components is too weak, it is apparent that its effect on secondary spectrum will be small. Hence, it may be stated that the lower limit on the powers of the front and rear flint elements measured in terms of the overall power of the system as unity should not be less than about 90% of the powers of the components of the system covered by the table of specifications. It is obvious that an upper limit on the powers of the front and rear flint elements must also exist, since otherwise the considerable chromatic effects introduced by these elements cannot be overcome with reasonable powers for the compensating lighter glasses. The upper limits of the powers of the two elements should, therefore, not be more than 130% of the powers of the corresponding elements of the system covered by the table of specifications, again measured in terms of the overall power of the system taken as unity.

In addition to the ranges of powers of the flint elements of the first and last components set forth above, the limits of 27.0 and 34.0 may be placed on the $v$-values of these elements. Lower $v$-values would be effective in reducing secondary spectrum but the very heavy flint glasses having such lower $v$-values are too yellowish for use in large objectives. Glasses of higher $v$-values cease to be effective in reducing secondary spectrum.

In the lens covered by the table of specifications, the powers of the flint elements of the first and last components measured numerically according to the thin lens formula $$\phi = (n-1)(C_1 - C_2)$$

where $$C_1 = \frac{1}{R_1}$$

etc., and with the overall power of the system taken as unity are, respectively, 0.778 and 0.913. The limits on the power of the first element are, therefore, 0.700 and 1.011, and the limits on the power of the last element are 0.822 and 1.187.

The next important limits in defining the invention have to do with the net power of the central lens group or apochromatizer. The net power of this group, where total thickness is also considered in determining the power, must necessarily be confined within fairly narrow limits. If the power is too highly positive, the effect on the curvatures of the system for a constant overall power is disadvantageous. Generally, positive power at low relative heights is less effective than at high relative heights and the lost power can be retrieved only by increasing curvatures at every point. My calculations show that the power of the apochromatizer should not be positive and an upper limit in the algebraic sense of 0.00 may be placed on this component.

The lower limit on the power of the apochromatizer is a negative value and can be set closely. If the component has too much negative power, equivalent negative power must be subtracted from the concave surfaces of the adjacent negative meniscus components. A lessening of the curvature of the concave surfaces of the menisci results in increasing the oblique spherical aberration for intermediate portions of the aperture and the most desirable arrangement is to have these negative surfaces as nearly concentric around the stop as the desired lens speed and size of system will permit. Flattening the field requires asymmetry in the system between positive and negative surfaces but at least a considerable portion of the aberrant refractions can be suppressed. Hence, if too much negative power is assigned to the apochromatizer, the adjacent concave surfaces must lose curvature beyond desirable limits with resultant deterioration in performance. I have found that the lower limit for the negative power of the apochromatizer can be set at −0.400, which is determined numerically by the difference between the reciprocals of object distance at the entering surface of the apochromatizer and image distance at the last surface of the apochromatizer. The power is again expressed in terms of the overall power of the system taken as unity. The power of the apochromatizer determined in this way becomes the equivalent of a simple lens of no thickness, that is, with the first and last surfaces coalescing. More complicated ways of determining the divergent action of the apochromatizer might be employed, but with no greater clarity. In the lens covered by the table of specifications, the power of the apochromatizer determined numerically as described is −0.267, which thus lies between the limits of −0.400 and 0.00.

In the new lens, the essential feature for correcting oblique spherical aberration is an increase in index across strongly curved, positive refracting surfaces within the structure of the apochromatizer. The oblique spherical aberration left in the system, after reduction by previously known methods, is of quite high order in terms of the power series defining the aberration and, hence, it is necessary to employ compensating refractions in the form of steep curvatures and difference in refractive index. The lower limit on the difference in index across the surfaces referred to may be set at 0.012 in green light, the equivalent value of the lower limit for the D-line being 0.0123. In the objective illustrated and covered by the table of specifications, the strongly curved, positive refracting surfaces are those having the radii $R_8$ and $R_9$ and the difference in index across those surfaces is 0.01283 in green light, or 0.01314 for the D-line, which is above the selected lower limit.

The upper limit on the increase in index across the specified surfaces within the apochromatizer is equally definite. If the difference in index is too great, there results too shallow a compensating curvature to achieve correction for the marginal rays, that is, too much ordinary spherical aberration would be introduced into the system and, when compensated by increased negative contributions from the concave surfaces of the menisci, would result in enhanced oblique spherical aberration. Accordingly, the upper limit on the difference in refractive index across the surfaces referred to may be placed at 0.030, the equivalent value of the upper limit for the D-line being 0.0303.

It may be stated that it is not necessary to place limits on the curvatures of the strongly curved positive refracting surfaces within the apochromatizer. These curvatures are assumed to be adjusted to bring about the correction or near correction for oblique spherical aberration, when taken together with an adopted glass pairing and hence difference in refractive index. Also, it is not necessary to define the precise structure of the apochromatizer beyond pointing out that it includes at least three elements and picking out from its structure those positive refracting surfaces of high curvature, which yield effective compensation for the oblique spherical aberration caused by the opposed concave surfaces of the meniscus components. The apochromatizer of the example includes five elements and the positive refracting surfaces, which compensate for oblique spherical aberration, as mentioned, are the surfaces ($R_8$, $R_9$) preceding and following the stop, when the stop is considered to lie in the central transverse plane through the apochromatizer. However, other forms of the apochromatizer may be used without affecting the compensation for oblique spherical aberration.

The features of the new objective not described in detail above should follow known practice carried to the best limits. The relative heights among the surfaces depend on considerations of low Petzval curvature, high light transmission, and elimination of chromatic spherical aberration. The powers of the several surfaces of the apochromatizer determine its total thickness at a given aperture and this in turn tends to locate the negative menisci. Elimination of astigmatism and distortion determine the bendings of the first and last components. The specific objective illustrated and covered by the table of specifications is corrected to a sufficient degree for spherical and zonal aberrations, primary and secondary spectrum, primary and secondary lateral color, chromatic spherical aberration, coma and chromatic coma, oblique coma, oblique spherical aberration, astigmatism and field curvature of the third and fifth orders, and distortion and chromatic distortion, and it minimizes vignetting.

In the appended claims, the term "strongly curved" is intended to refer to surfaces of a radius not greater than one-fourth of the equivalent focal length of the objective.

I claim:

1. An object for photographic purposes corrected for spherical and chromatic aberrations, including oblique spherical aberration, coma, astigmatism, field curvature, and distortion and having greatly reduced secondary spectrum, which is made wholly of stable optical glasses and comprises a pair of outer components of net collective effect, each including a collective element of high index of refraction ranging from 1.80 to 1.65 and high dispersion corresponding to a $v$-value ranging from 27 to 34, a pair of components of net negative effect between the collective components, the negative components being of meniscus form and having their concave surfaces opposed, and an apochromatizing component between the negative components and including at least three elements, the central one of which is negative, the apochromatizing component having a power, measured in terms of the overall power of the system taken as unity, ranging from 0.00 to −0.400.

2. An objective as defined in claim 1, characterized in that, in the apochromatizing component, the surfaces on opposite sides of the central transverse plane through the component are strongly curved and positively refracting and there is an index difference across both surfaces ranging from 0.012 to 0.030 for green light.

3. An objective as defined in claim 1, characterized in that the power of each collective component, measured in terms of the overall power of the objective taken as unity, ranges from 0.700 to 1.187.

4. An objective as defined in claim 1, characterized in that the powers of the front and rear collective components, measured in terms of the overall power of the objective taken as unity, range, respectively, from 0.700 to 1.011 and from 0.822 to 1.187.

5. An objective as defined in claim 1, characterized in that each negative component is a meniscus doublet, which is only slightly hyperchromatic.

6. An objective as defined in claim 1, characterized in that the apochromatizing component consists of five elements cemented together, the first, third, and fifth of the elements being negative and the second and fourth positive.

7. An objective as defined in claim 1, characterized in that the apochromatizing component includes a central negative element lying between and cemented to a pair of positive elements, the cemented surfaces are strongly curved, and the positive elements of the component are made of the same glass, which has a higher index of refraction than that of the central element.

8. An objective comprising a plurality of axially aligned components having numerical data substantially as follows:

[Objective: EF 1.000   f/3.5]

| Lens | $N_D$ | V | Glass Types | Radii | Thicknesses |
|---|---|---|---|---|---|
| I | 1.72 | 29.3 | EDF-3 | $R_1 = 0.7105$ | $t_1=0.0521$ |
|   |      |      |       | $R_2 = 2.979$  | $S_1=0.0026$ |
| II | 1.517 | 64.5 | BSC-2 | $R_3 = 0.2751$ | $t_2=0.1284$ |
| III | 1.527 | 51.1 | KzF-6 | $R_4 = $ plano | $t_3=0.0174$ |
|    |       |      |       | $R_5 = 0.1805$ | $S_2=0.0608$ |
| IV | 1.617 | 36.6 | DF-2 | $R_6 = $ plano | $t_4=0.0130$ |
| V | 1.540 | 59.6 | BaK-2 | $R_7 = 0.1975$ | $t_5=0.0912$ |
| VI | 1.527 | 51.1 | KzF-6 | $R_8 = -0.1695$ | $t_6=0.0174$ |
| VII | 1.540 | 59.6 | BaK-2 | $R_9 = 0.1609$ | $t_7=0.0912$ |
| VIII | 1.617 | 36.6 | DF-2 | $R_{10}=-0.2568$ | $t_8=0.0130$ |
|    |       |      |       | $R_{11}=-2.4296$ | $S_3=0.0615$ |
| IX | 1.527 | 51.1 | KzF-6 | $R_{12}=-0.2483$ | $t_9=0.0174$ |
| X | 1.540 | 59.6 | BaK-2 | $R_{13}=$ plano | $t_{10}=0.1034$ |
|    |       |      |       | $R_{14}=-0.2737$ | $S_4=0.0174$ |
| XI | 1.72 | 29.3 | EDF-3 | $R_{15}=-6.293$ | $t_{11}=0.0478$ |
|    |       |      |       | $R_{16}=-0.7060$ | $S_5=0.6903$ | in which $R_1$, $R_2$ . . . indicate the radii of the individual surfaces starting from the front, $t_1$, $t_2$ . . . indicate the axial thicknesses of the individual elements, and $S_1$, $S_2$ . . . indicate the axial lengths of the air spaces between the components, $S_5$ being the back focal length.

JAMES G. BAKER.

REFERENCES CITED

The following references are of record in the file of this patent:

UNITED STATES PATENTS

| Number | Name | Date |
|---|---|---|
| 435,271 | Abbe | Aug. 26, 1890 |
| 2,254,511 | Bertele | Sept. 2, 1941 |
| 2,348,667 | Warmisham | May 9, 1944 |
| 2,349,893 | Warmisham et al. | May 30, 1944 |
| 2,430,150 | Warmisham | Nov. 4, 1947 |
| 2,443,156 | Altman et al. | June 8, 1948 |
| 2,516,724 | Roossinov | July 25, 1950 |
| 2,532,751 | Baker | Dec. 5, 1950 |

FOREIGN PATENTS

| Number | Country | Date |
|---|---|---|
| 157,040 | Great Britain | Jan. 20, 1921 |